United States Patent
Zhao et al.

(10) Patent No.: US 9,515,791 B2
(45) Date of Patent: Dec. 6, 2016

(54) MULTI-ACCESS POINT CALIBRATION METHOD AND DEVICE

(71) Applicant: ZTE Corporation, Shenzhen (CN)

(72) Inventors: Yajun Zhao, Shenzhen (CN); Linmei Mo, Shenzhen (CN); Hanqing Xu, Shenzhen (CN); Jun Huang, Shenzhen (CN); Yujie Li, Shenzhen (CN); Baoyu Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/414,296

(22) PCT Filed: Jun. 28, 2013

(86) PCT No.: PCT/CN2013/078322
§ 371 (c)(1),
(2) Date: Jan. 12, 2015

(87) PCT Pub. No.: WO2013/178122
PCT Pub. Date: Dec. 5, 2013

(65) Prior Publication Data
US 2015/0207597 A1    Jul. 23, 2015

(30) Foreign Application Priority Data

Aug. 14, 2012 (CN) .......................... 2012 1 0288628

(51) Int. Cl.
*H04L 5/00* (2006.01)
*H04L 1/00* (2006.01)
(Continued)

(52) U.S. Cl.
CPC ........... *H04L 5/0035* (2013.01); *H04L 1/0003* (2013.01); *H04W 24/02* (2013.01); *H04W 24/08* (2013.01); *H04W 56/001* (2013.01); *H04W 72/042* (2013.01); *H04W 72/0413* (2013.01); *H04W 72/0426* (2013.01); *H04B 7/024* (2013.01); *H04W 24/06* (2013.01); *H04W 88/08* (2013.01); *H04W 88/10* (2013.01)

(58) Field of Classification Search
None
See application file for complete search history.

(56) References Cited

U.S. PATENT DOCUMENTS 8,797,966 B2 * 8/2014 Dinan .................. H04L 5/0057
370/252
2005/0219118 A1 10/2005 Kubo et al.
(Continued)

FOREIGN PATENT DOCUMENTS

CN    101742518 A    6/2010
CN    101753185 A    6/2010

OTHER PUBLICATIONS

Supplementary European Search Report of EP Application No. 13796301, dated Aug. 6, 2015.
(Continued)

*Primary Examiner* — Eunsook Choi
(74) *Attorney, Agent, or Firm* — Banner & Witcoff, Ltd.

(57) ABSTRACT

A method and device for multi-access point calibration are disclosed. The method includes: a base station estimating a value closest to a true parameter deviation in a value interval of an uplink and downlink channel parameter deviation between access points, wherein the parameter deviation includes a phase difference and an amplitude difference; and the base station performing phase and/or amplitude calibration on service data transmitted jointly by the access points according to the value. With the method and device provided in the present document, a cell calculates a parameter difference between different access points, and then calibrates multiple access points according to the parameter difference, so as to solve a problem that the phase difference and amplitude difference exist between the data transmitted jointly between the multiple access points, and thus it can be guaranteed that good coherent transmission is performed between the access points, thereby improving the system performance.

20 Claims, 3 Drawing Sheets

(51) Int. Cl.
*H04W 24/02* (2009.01)
*H04W 24/08* (2009.01)
*H04W 56/00* (2009.01)
*H04W 72/04* (2009.01)
*H04W 24/06* (2009.01)
*H04W 88/10* (2009.01)
*H04W 88/08* (2009.01)
*H04B 7/02* (2006.01)

(56) References Cited

U.S. PATENT DOCUMENTS

| | | | |
|---|---|---|---|
| 2011/0044193 A1* | 2/2011 | Forenza | H04B 7/024 370/252 |
| 2012/0087430 A1* | 4/2012 | Forenza | H04B 7/024 375/267 |
| 2013/0077514 A1* | 3/2013 | Dinan | H04L 5/0057 370/252 |

OTHER PUBLICATIONS

3GPP TSG Ran WG1, Meeting #70, R1-123214, Qingdao, China, Aug. 13-17, 2012, CATT, CQI Definition for Non-PMI Feedback in CoMP, 7.5.1.2, Discussion and Decision, 8 pages.
3GPP TSG Ran WG1, Meeting #68, R1-120095, Dresden, Germany, Feb. 6-10, 2012, CATT, Discussion on Aggregated Feedback, 7.5.1.2, Discussion and Decision, 4 pages.
3GPP TSG RAN WG1, Meeting #66. R1-112418, 6.6.1, Alcatel-Lucent Shanghai Bell, Alcatel-Lucent, Antenna Calibration for TDD CoMP Scenarios 3 and 4, Discussion and Decision, 4 pages.
International Search Report of PCT/CN2013/078322, dated Oct. 10, 2013.

* cited by examiner

MULTI-ACCESS POINT CALIBRATION METHOD AND DEVICE

TECHNICAL FIELD

The present document relates to the field of communication, and specifically, to a method and device for multi-access point calibration.

BACKGROUND

With the people's increasing requirements on the future communication, a cell-edge spectrum efficiency is more valued, and how to improve a cell-edge transmission quality and throughput capacity becomes a hot research topic. Antennas of multiple Access Points (AP) are adopted to transmit and receive coordinately in the Coordinated Multi-Point (CoMP) technology, one or more access points are set for one base station (cell), the multiple points of the CoMP coordination can be multiple access points from one cell or multiple access points from multiple cells, wherein, cells includes a primary cell and a coordinated cell of the terminal. A cell-edge interference problem can be effectively solved with the CoMP, which then increases a capacity and reliability of the wireless links. Therefore, the CoMP technology is introduced into a Long Term Evolution-Advanced (LTE-A) system as a key technology.

A CoMP system considers an antenna calibration problem between APs in a Time Division Duplexing (TDD) mode, respective independent antenna calibration results of the APs are: $H_{DL}=C*H_{UL}$, wherein C is a plural scalar of a downlink deviation and it includes a phase and an amplitude, $H_{DL}$ is a downlink channel frequency domain response, and $H_{UL}$ is an uplink channel frequency domain response; the antenna calibration does not influence a single AP, but uplink and downlink channel deviations C of different APs are different. Therefore, when the CoMP system has multiple APs, uplink and downlink channel parameter differences resulted from differences of plurals C will exist between different APs, including a phase difference and an amplitude difference. For example, if an uplink and downlink channel frequency domain response difference of an AP1 is C1, and an uplink and downlink channel difference of an AP2 is C2, an uplink and downlink channel parameter difference between the AP1 and the AP2 is $\Delta C=C1/C2$. This makes the phase difference and amplitude difference exist between data in Joint Transmission (JT) of different APs, which causes that the data cannot be transmitted coherently between the APs well, thereby degrading the system performance.

SUMMARY

The present document provides a method and device for multi-access point calibration, to solve a problem that a phase difference and an amplitude difference exist between data transmitted jointly between multiple APs so that the data cannot be transmitted coherently between the APs well, thereby improving the system performance.

In order to solve the above technical problem, the present document provides a method for multi-access point calibration, which comprises:

a base station estimating a value closest to a true parameter deviation in a value interval of an uplink and downlink channel parameter deviation between access points; and the base station performing parameter calibration on service data transmitted jointly by the access points according to the value.

The parameter deviation comprises: a phase difference and an amplitude difference;

the step of a base station estimating a value closest to a true parameter deviation in a value interval of an uplink and downlink channel parameter deviation between access points comprises: the base station estimating a phase difference value closest to a true phase difference in a value interval of an uplink and downlink channel phase difference between the access points; and/or, the base station estimating an amplitude difference value closest to a true amplitude difference in a value interval of an uplink and downlink channel amplitude difference between the access points; and the step of the base station performing parameter calibration on service data transmitted jointly by the access points according to the value comprises: the base station performing phase calibration on the data transmitted jointly by the access points according to the estimated phase difference value; and/or, the base station performing amplitude calibration on the data transmitted jointly by the access points according to the estimated amplitude difference value.

The step of the base station estimating a phase difference value closest to a true phase difference in a value interval of an uplink and downlink channel phase difference between the access points comprises:

the base station traversing values in the value interval of the phase difference, and performing phase calibration on the service data transmitted jointly by the access points according to phase differences of traversed values, and transmitting service data on which the phase calibration is performed to a User Equipment (UE); and according to correct or incorrect receiving judgment information returned by the UE, the base station performing statistics of an error rate or performing open loop link adaption to adjust a Modulation and Coding Scheme (MCS) level, and estimating the phase difference value closest to the true phase difference in the phase differences of the traversed values in accordance with a preset estimation policy according to the error rate or the MCS level.

The preset estimation policy comprises:

after the base station uses a phase difference in the value interval of the phase difference to calibrate the service data, if a difference between the error rate obtained from the statistics according to feedback of the UE and an error rate without parameter deviation is less than a preset threshold, judging the phase difference as a phase difference closest to a true phase difference; or, after the base station uses a phase difference in the value interval of the phase difference to calibrate the service data, if a difference between the MCS level obtained by performing open loop link adaption adjustment according to feedback of the UE and an MCS level without parameter deviation is less than a preset threshold, judging the phase difference as a phase difference closest to a true phase difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;

or, after the base station uses the phase differences of the traversed values to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference closest to a true phase difference;

or, after the base station uses the phase differences of the traversed values to calibrate the service data, comparing the error rate obtained from the statistics according to feedback of the UE or the MCS level obtained by performing the open loop link adaption adjustment, and taking a phase difference with a highest error rate or a lowest MCS level correspondingly obtained in the phase differences of the traversed values plus or minus pi as a phase difference closest to a true phase difference.

The step of the base station estimating an amplitude difference value closest to a true amplitude difference in a value interval of an uplink and downlink channel amplitude difference between the access points comprises:

the base station traversing values in the value interval of the amplitude difference, performing amplitude calibration on the service data transmitted jointly by the access points according to amplitude differences of traversed values, and transmitting service data on which the amplitude calibration is performed to the UE; and according to correct or incorrect receiving judgment information returned by the UE, the base station performing statistics of an error rate or performing open loop link adaption to adjust an MCS level, and estimating the amplitude difference value closest to the true amplitude difference in the amplitude differences of the traversed values in accordance with a preset policy according to the error rate or the MCS level.

The preset policy comprises:

after the base station uses an amplitude difference in the value interval of the amplitude difference to calibrate the service data, if a difference between the error rate obtained from the statistics according to feedback of the UE and an error rate without parameter deviation is less than a preset threshold, judging the amplitude difference as an amplitude difference closest to a true amplitude difference; or, after the base station uses an amplitude difference in the value interval of the amplitude difference to calibrate the service data, if a difference between the MCS level obtained by performing open loop link adaption adjustment according to feedback of the UE and an MCS level without parameter deviation is less than a preset threshold, judging the amplitude difference as an amplitude difference closest to a true amplitude difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;

or, after the base station uses the amplitude differences of the traversed values to calibrate the service data, comparing the error rate obtained from the statistics according to feedback of the UE or the MCS level obtained by performing the open loop link adaption adjustment, and taking an amplitude difference with a lowest error rate or a highest MCS level correspondingly obtained in the amplitude differences of the traversed values as an amplitude difference closest to a true amplitude difference.

The step of the base station estimating a phase difference value closest to a true phase difference in a value interval of an uplink and downlink channel phase difference between the access points, and meanwhile estimating an amplitude difference value closest to a true amplitude difference in a value interval of an uplink and downlink channel amplitude difference between the access points comprises:

the base station traversing values in the value interval of the phase difference and the value interval of the amplitude difference, and performing phase calibration and amplitude calibration simultaneously on the service data transmitted jointly by the access points according to phase differences of traversed values and amplitude differences of traversed values, and transmitting service data on which the phase calibration and the amplitude calibration are performed to the UE; and according to correct or incorrect receiving judgment information returned by the UE, the base station performing statistics of an error rate or performing open loop link adaption to adjust an MCS level, and estimating the phase difference value closest to the true phase difference in the phase differences of the traversed values and the amplitude difference value closest to the true amplitude difference in the amplitude differences of the traversed values in accordance with a preset policy according to the error rate or the MCS level.

The preset policy comprises:

after the base station uses a phase difference in the value interval of the phase difference and an amplitude difference in the value interval of the amplitude difference to calibrate the service data, if a difference between the error rate obtained from the statistics according to feedback of the UE and an error rate without parameter deviation is less than a preset threshold, judging the phase difference as a phase difference value closest to a true phase difference and the amplitude difference as an amplitude difference closest to a true amplitude difference; or, after the base station uses a phase difference in the value interval of the phase difference and an amplitude difference in the value interval of the amplitude difference to calibrate the service data, if a difference between the MCS level obtained by performing open loop link adaption adjustment according to feedback of the UE and an MCS level without parameter deviation is less than a preset threshold, judging the phase difference as a phase difference value closest to a true phase difference and the amplitude difference as an amplitude difference closest to a true amplitude difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;

or, after the base station uses a phase difference in the value interval of the phase difference and an amplitude difference in the value interval of the amplitude difference to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference value closest to a true phase difference and an amplitude difference with a lowest error rate or a highest MCS level correspondingly obtained in the amplitude differences of the traversed values as an amplitude difference value closest to the true amplitude difference.

The method further comprises: before performing phase calibration on the service data transmitted jointly by the access points according to the phase differences of the traversed values, and/or performing amplitude calibration on the service data transmitted jointly by the access points according to the amplitude differences of the traversed values, the base station firstly performing code modulation of the MCS level without parameter deviation on the service data.

The embodiment of the present document further provides a device for multi-access point calibration, which comprises:

a parameter deviation estimation module, configured to: estimate a value closest to a true parameter deviation in a value interval of an uplink and downlink channel parameter deviation between access points; and a parameter calibration module, configured to: perform parameter calibration on service data transmitted jointly by the access points according to the value estimated by the parameter deviation estimation module.

The parameter deviation comprises: a phase difference and an amplitude difference;

the parameter deviation estimation module comprises:

a phase difference estimation module, configured to: estimate a phase difference value closest to a true phase difference in a value interval of an uplink and downlink channel phase difference between the access points;

an amplitude difference estimation module, configured to: estimate an amplitude difference value closest to a true amplitude difference in a value interval of an uplink and downlink channel amplitude difference between the access points; and a phase difference and amplitude difference estimation module, configured to: estimate a phase difference value closest to a true phase difference in a value interval of an uplink and downlink channel phase difference between the access points, and meanwhile estimate an amplitude difference value closest to a true amplitude difference in a value interval of an uplink and downlink channel amplitude difference between the access points;

wherein, the parameter calibration module is configured to perform parameter calibration on service data transmitted jointly by the access points in the following way:

performing phase calibration on the data transmitted jointly by the access points according to the estimated phase difference value; and/or, performing amplitude calibration on the data transmitted jointly by the access points according to the estimated amplitude difference value.

The phase difference estimation module is configured to estimate a phase difference value closest to a true phase difference in the following way:

traversing values in the value interval of the phase difference, and performing phase calibration on the service data transmitted jointly by the access points according to phase differences of traversed values, and transmitting service data on which the phase calibration is performed to a User Equipment (UE); and according to correct or incorrect receiving judgment information returned by the UE, performing statistics of an error rate or performing open loop link adaption to adjust a Modulation and Coding Scheme (MCS) level, and estimating a phase difference closest to the true phase difference in the phase differences of the traversed values in accordance with a preset estimation policy according to the error rate or the MCS level.

The phase difference estimation module is further configured to: before performing phase calibration on the service data transmitted jointly by the access points according to the phase differences of the traversed values, firstly perform code modulation of the MCS level without parameter deviation on the service data.

The preset estimation policy comprises:

after the phase difference estimation module uses a phase difference in the value interval of the phase difference to calibrate the service data, if a difference between the error rate obtained from the statistics according to feedback of the UE and an error rate without parameter deviation is less than a preset threshold, judging the phase difference as a phase difference closest to a true phase difference; or, after the phase difference estimation module uses a phase difference in the value interval of the phase difference to calibrate the service data, if a difference between the MCS level obtained by performing open loop link adaption adjustment according to feedback of the UE and an MCS level without parameter deviation is less than a preset threshold, judging the phase difference as a phase difference closest to a true phase difference; wherein, the MCS level without parameter deviation is obtained by a base station in which the device is located requesting the UE for acquisition, and the error rate without parameter deviation is an error rate assumed when the UE measures the MCS level without parameter deviation and previously appointed by the base station and the UE;

or, after the phase difference estimation module uses the phase differences of the traversed values to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference closest to a true phase difference;

or, after the phase difference estimation module uses the phase differences of the traversed values to calibrate the service data, comparing the error rate obtained from the statistics according to feedback of the UE or the MCS level obtained by performing the open loop link adaption adjustment, and taking a phase difference with a highest error rate or a lowest MCS level correspondingly obtained in the phase differences of the traversed values plus or minus pi as a phase difference closest to a true phase difference.

The amplitude difference estimation module is configured to estimate an amplitude difference value closest to a true amplitude difference in the following way:

traversing values in the value interval of the amplitude difference, and performing amplitude calibration on the service data transmitted jointly by the access points according to amplitude differences of traversed values, and transmitting service data on which the amplitude calibration is performed to the UE; and according to correct or incorrect receiving judgment information returned by the UE, performing statistics of an error rate or performing open loop link adaption to adjust an MCS level, and estimating the amplitude difference value closest to the true amplitude difference in the amplitude differences of the traversed values in accordance with a preset policy according to the error rate or the MCS level.

The amplitude difference estimation module is further configured to: before performing amplitude calibration on the service data transmitted jointly by the access points according to the amplitude differences of the traversed values, firstly perform code modulation of the MCS level without parameter deviation on the service data.

The preset policy comprises:

after the amplitude difference estimation module uses an amplitude difference in the value interval of the amplitude difference to calibrate the service data, if a difference between the error rate obtained from the statistics according to feedback of the UE and an error rate without parameter deviation is less than a preset threshold, judging the amplitude difference as an amplitude difference closest to a true amplitude difference; or, after the amplitude difference estimation module uses an amplitude difference in the value interval of the amplitude difference to calibrate the service data, if a difference between the MCS level obtained by performing open loop link adaption adjustment according to feedback of the UE and an MCS level without parameter deviation is less than a preset threshold, judging the amplitude difference as an amplitude difference closest to a true amplitude difference; wherein, the MCS level without parameter deviation is obtained by a base station in which the device is located requesting the UE for acquisition, and the error rate without parameter deviation is an error rate assumed when the UE measures the MCS level without parameter deviation and previously appointed by the base station and the UE;

or, after the amplitude difference estimation module uses the amplitude differences of the traversed values to calibrate the service data, comparing the error rate obtained from the statistics according to feedback of the UE or the MCS level obtained by performing the open loop link adaption adjustment, and taking an amplitude difference with a lowest error rate or a highest MCS level correspondingly obtained in the amplitude differences of the traversed values as an amplitude difference closest to a true amplitude difference.

The phase difference and amplitude difference estimation module is configured to estimate a phase difference value closest to a true phase difference, and meanwhile estimate an amplitude difference value closest to a true amplitude difference in the following way:

traversing values in the value interval of the phase difference and the value interval of the amplitude difference, and performing phase calibration and amplitude calibration simultaneously on the service data transmitted jointly by the access points according to phase differences of traversed values and amplitude differences of traversed values, and transmitting service data on which the phase calibration and the amplitude calibration are performed to the UE; and according to correct or incorrect receiving judgment information returned by the UE, performing statistics of an error rate or performing open loop link adaption to adjust an MCS level, and estimating the phase difference value closest to the true phase difference in the phase differences of the traversed values and the amplitude difference value closest to the true amplitude difference in the amplitude differences of the traversed values in accordance with a preset policy according to the error rate or the MCS level.

The phase difference and amplitude difference estimation module is further configured to: before performing phase calibration and amplitude calibration on the service data transmitted jointly by the access points according to the phase differences of the traversed values and the amplitude differences of the traversed values, firstly perform code modulation of the MCS level without parameter deviation on the service data.

The preset policy comprises:

after the phase difference and amplitude difference estimation module uses a phase difference in the value interval of the phase difference and an amplitude difference in the value interval of the amplitude difference to calibrate the service data, if a difference between the error rate obtained from the statistics according to feedback of the UE and an error rate without parameter deviation is less than a preset threshold, judging the phase difference as a phase difference value closest to a true phase difference and the amplitude difference as an amplitude difference closest to a true amplitude difference; or, after the phase difference and amplitude difference estimation module uses a phase difference in the value interval of the phase difference and an amplitude difference in the value interval of the amplitude difference to calibrate the service data, if a difference between the MCS level obtained by performing open loop link adaption adjustment according to feedback of the UE and an MCS level without parameter deviation is less than a preset threshold, judging the phase difference as a phase difference value closest to a true phase difference and the amplitude difference as an amplitude difference closest to a true amplitude difference; wherein, the MCS level without parameter deviation is obtained by a base station in which the device is located requesting the UE for acquisition, and the error rate without parameter deviation is an error rate assumed when the UE measures the MCS level without parameter deviation and previously appointed by the base station and the UE;

or, after the phase difference and amplitude difference estimation module uses a phase difference in the value interval of the phase difference and an amplitude difference in the value interval of the amplitude difference to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference value closest to a true phase difference and an amplitude difference with a lowest error rate or a highest MCS level correspondingly obtained in the amplitude differences of the traversed values as an amplitude difference value closest to a true amplitude difference.

Compared with the related art, with the method and device for multi-access point calibration provided in the embodiment of the present document, a cell calculates a parameter difference between different access points, and then multiple access points are calibrated according to the parameter difference, so as to solve a problem that the phase difference and amplitude difference exist between the data transmitted jointly between the multiple access points, and thus it can be guaranteed that good coherent transmission is performed between the access points, thereby improving the system performance.

PREFERRED EMBODIMENTS OF THE PRESENT DOCUMENT

The examples of the present document will be described in detail in combination with the accompanying drawings below. It should be noted that the examples in the present application and the characteristics in the examples can be optionally combined with each other in the condition of no conflict.

EXAMPLES

A deviation from the channel reciprocity between Radio Remote Units (RRU)/access points is a system deviation between two access points, once the two access points provide a joint transmission JT service, any one of the UEs faces the same phase difference, that is to say, a parameter deviation is decided by the access points and it is unrelated to the UE. Therefore, if a value closest to the true parameter deviation between the two access points can be obtained, and parameter calibration is performed on the service data transmitted jointly by the APs with the value, a problem that the phase difference and amplitude difference exist between the data transmitted jointly between the multiple access points can be avoided, and thus it can be guaranteed that good coherent transmission is performed between the access points.

Figure 1:
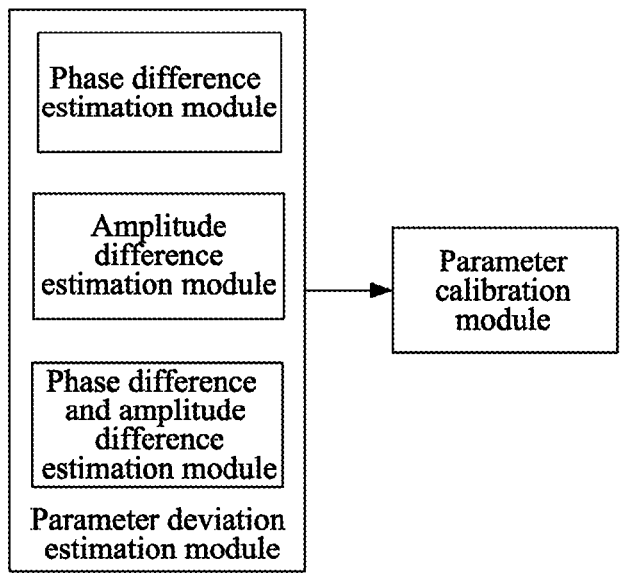
FIG. 1 is a structure diagram of a device for multi-access point calibration in the example.

As shown in FIG. 1, the example provides a device for multi-access point calibration, which includes:

a parameter deviation estimation module, configured to: estimate a value closest to a true parameter deviation in a value interval of an uplink and downlink channel parameter deviation between access points (APs); and a parameter calibration module, configured to: perform parameter calibration on service data transmitted jointly by the access points (APs) according to the value.

Wherein, the parameter deviation includes: a phase difference $\Delta\theta$ and an amplitude difference $\Delta A$; the parameter deviation estimation module includes: a phase difference estimation module, an amplitude difference estimation module and a phase difference and amplitude difference estimation module, therefore, the device can perform phase calibration and amplitude calibration individually, and it also can perform phase calibration and amplitude calibration simultaneously, wherein:

the phase difference estimation module is configured to: estimate a phase difference value closest to a true phase difference in a value interval of an uplink and downlink channel phase difference between the access points;

the amplitude difference estimation module is configured to: estimate an amplitude difference value closest to a true amplitude difference in a value interval of an uplink and downlink channel amplitude difference between the access points; and the phase difference and amplitude difference estimation module is configured to: estimate a phase difference value closest to a true phase difference in a value interval of an uplink and downlink channel phase difference between the access points, and meanwhile estimate an amplitude difference value closest to a true amplitude difference in a value interval of an uplink and downlink channel amplitude difference between the access points;

the parameter calibration module performs characteristic parameter calibration on the service data transmitted jointly by the APs according to the value in the following way:

performing phase calibration on the data transmitted jointly by the access points according to the estimated phase difference value; and/or, performing amplitude calibration on the data transmitted jointly by the access points according to the estimated amplitude difference value.

Wherein, the phase difference estimation module estimates the phase difference value closest to the true phase difference in the value interval of the uplink and downlink channel phase difference between the access points in the following way:

the phase difference estimation module traversing values in the value interval, and performing phase calibration on the service data transmitted jointly by the access points according to phase differences of the traversed values, and transmitting service data on which the phase calibration is performed to a User Equipment (UE); and according to correct or incorrect receiving judgment information returned by the UE, the phase difference estimation module performing statistics of an error rate or performing open loop link adaption to adjust a Modulation and Coding Scheme (MCS) level, and estimating a phase difference value closest to the true phase difference in the phase differences of the traversed values in accordance with a preset estimation policy according to the error rate or the MCS level.

Wherein, the phase difference estimation module is further configured to: before performing phase calibration on the service data transmitted jointly by the access points according to the phase differences of the traversed values, firstly perform code modulation of the MCS level without parameter deviation on the service data.

Wherein, the preset estimation policy includes:

after the phase difference estimation module uses a certain phase difference in the value interval to calibrate the service data, if a difference between the error rate obtained from the statistics according to feedback of the UE and an error rate without parameter deviation is less than a preset threshold, judging the phase difference as a phase difference value closest to a true phase difference; or, after the phase difference estimation module uses a certain phase difference in the value interval to calibrate the service data, if a difference between the MCS level obtained by performing open loop link adaption adjustment according to feedback of the UE and an MCS level without parameter deviation is less than a preset threshold, judging the phase difference as a phase difference value closest to a true phase difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;

or, after the phase difference estimation module uses the phase differences of the traversed values to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference closest to a true phase difference;

or, after the phase difference estimation module uses the phase differences of the traversed values to calibrate the service data, comparing the error rate obtained from the statistics according to feedback of the UE or the MCS level obtained by performing the open loop link adaption adjustment, taking a phase difference with a highest error rate or a lowest MCS level correspondingly obtained in the phase differences of the traversed values plus or minus pi as a phase difference closest to a true phase difference.

Wherein, the amplitude difference estimation module estimates the amplitude difference value closest to the true amplitude difference in the value interval of the uplink and downlink channel amplitude difference between the access points in the following way:

the amplitude difference estimation module traversing values in the value interval, and performing amplitude calibration on the service data transmitted jointly by the access points according to amplitude differences of the traversed values, and transmitting service data on which the amplitude calibration is performed to the user equipment UE; and according to correct or incorrect receiving judgment information returned by the UE, the amplitude difference estimation module performing statistics of an error rate or performing open loop link adaption to adjust a modulation and coding scheme MCS level, and estimating the amplitude difference value closest to the true amplitude difference in the amplitude differences of the traversed values in accordance with a preset policy according to the error rate or the MCS level.

Wherein, the amplitude difference estimation module is further configured to: before performing amplitude calibration on the service data transmitted jointly by the access points according to the amplitude differences of the traversed values, firstly perform code modulation of the MCS level without parameter deviation on the service data.

Wherein, the preset policy includes:

after the amplitude difference estimation module uses a certain amplitude difference in the value interval to calibrate the service data, if a difference between the error rate obtained from the statistics according to feedback of the UE and an error rate without parameter deviation is less than a preset threshold, judging the amplitude difference as an amplitude difference value closest to a true amplitude difference; or, after the amplitude difference estimation module uses a certain amplitude difference in the value interval to calibrate the service data, if a difference between the MCS level obtained by performing open loop link adaption adjustment according to feedback of the UE and an MCS level without parameter deviation is less than a preset threshold, judging the amplitude difference as an amplitude difference value closest to a true amplitude difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;

or, after the amplitude difference estimation module uses the amplitude differences of the traversed values to calibrate the service data, comparing the error rate obtained from the statistics according to feedback of the UE or the MCS level obtained by performing the open loop link adaption adjustment, and taking an amplitude difference with a lowest error rate or a highest MCS level correspondingly obtained in the amplitude differences of the traversed values as an amplitude difference value closest to a true amplitude difference.

The phase difference and amplitude difference estimation module estimates the phase difference value closest to the true phase difference in the value interval of the uplink and downlink channel phase difference between the access points, and meanwhile estimates the amplitude difference value closest to the true amplitude difference in the value interval of the uplink and downlink channel amplitude difference between the access points in the following way:

the phase difference and amplitude difference estimation module traversing values in the value interval of the phase difference and the value interval of the amplitude difference, and performing phase calibration and amplitude calibration simultaneously on the service data transmitted jointly by the access points according to phase differences of the traversed values and amplitude differences of the traversed values, and transmitting service data on which the phase calibration and the amplitude calibration are performed to the user equipment UE; and according to correct or incorrect receiving judgment information returned by the user equipment UE, the phase difference and amplitude difference estimation module performing statistics of an error rate or performing open loop link adaption to adjust a modulation and coding scheme MCS level, and estimating the phase difference value closest to the true phase difference in the phase differences of the traversed values and the amplitude difference value closest to the true amplitude difference in the amplitude differences of the traversed values in accordance with a preset policy according to the error rate or the MCS level.

Wherein, the phase difference and amplitude difference estimation module is further configured to: before performing phase calibration and amplitude calibration on the service data transmitted jointly by the access points according to the phase differences of the traversed values and the amplitude differences of the traversed values, firstly perform code modulation of the MCS level without parameter deviation on the service data.

Wherein, the preset policy includes:

after the phase difference and amplitude difference estimation module uses a certain phase difference in the value interval of the phase difference and a certain amplitude difference in the value interval of the amplitude difference to calibrate the service data, if a difference between the error rate obtained from the statistics according to feedback of the UE and an error rate without parameter deviation is less than a preset threshold, judging the phase difference as a phase difference value closest to a true phase difference and the amplitude difference as an amplitude difference value closest to a true amplitude difference; or, after the phase difference and amplitude difference estimation module uses a certain phase difference in the value interval of the phase difference and a certain amplitude difference in the value interval of the amplitude difference to calibrate the service data, if a difference between the MCS level obtained by performing open loop link adaption adjustment according to feedback of the UE and an MCS level without parameter deviation is less than a preset threshold, judging the phase difference as a phase difference value closest to a true phase difference and the amplitude difference as an amplitude difference value closest to a true amplitude difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;

or, after the phase difference and amplitude difference estimation module uses a certain phase difference in the value interval of the phase difference and a certain amplitude difference in the value interval of the amplitude difference to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference value closest to a true phase difference and an amplitude difference with a lowest error rate or a highest MCS level correspondingly obtained in the amplitude differences of the traversed values as an amplitude difference value closest to a true amplitude difference.

Figure 2:
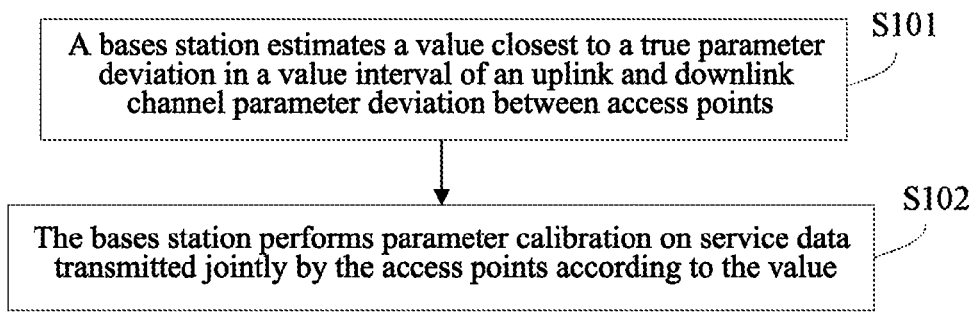
FIG. 2 is a flow diagram of a method for multi-access point calibration in the example.

As shown in FIG. 2, the example provides a method for multi-access point calibration, and the following steps are included.

In step S101, a bases station estimates a value closest to a true parameter deviation in a value interval of an uplink and downlink channel parameter deviation between access points.

In step S102, the bases station performs parameter calibration on service data transmitted jointly by the access points according to the value.

In the above step S101, the parameter deviation includes: a phase difference $\Delta\theta$ and an amplitude difference $\Delta A$; and it specifically includes:

the base station estimating a phase difference value closest to a true phase difference in a value interval of an uplink and downlink channel phase difference between the APs; and/or, the base station estimating an amplitude difference value closest to a true amplitude difference in a value interval of an uplink and downlink channel amplitude difference between the APs; and then, the base station performing phase calibration on the data transmitted jointly by the APs according to the estimated phase difference value; and/or, the base station performing amplitude calibration on the data transmitted jointly by the APs according to the estimated amplitude difference value.

That is to say, in the example, it can perform the phase calibration or amplitude calibration individually, and it can also perform the phase calibration and amplitude calibration simultaneously.

Figure 3:
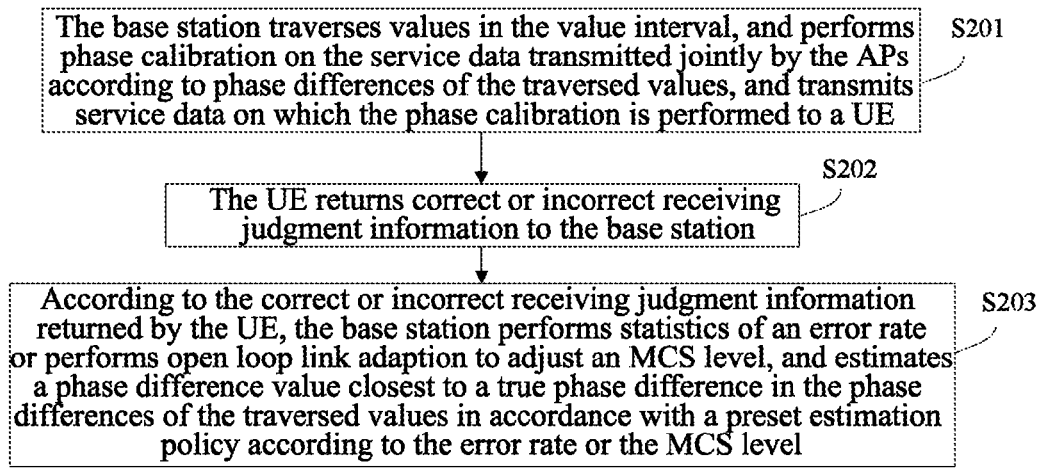
FIG. 3 is a flow diagram of estimating a phase difference value in the example.

Wherein, as shown in FIG. 3, the step of the base station estimating a phase difference value closest to a true phase difference in a value interval of an uplink and downlink channel phase difference between the APs includes the following steps.

In step S201, the base station traverses values in the value interval, and performs phase calibration on the service data transmitted jointly by the APs according to phase differences of the traversed values, and transmits service data on which the phase calibration is performed to a UE.

Wherein, before performing phase calibration on the service data transmitted jointly by the APs according to the phase differences of the traversed values, the base station also performs code modulation of the MCS level without parameter deviation on the service data. Since the MCS level without parameter deviation is unique, in this way, it can be guaranteed that an error rate obtained from the statistics or an MCS level obtained from the open loop link adaption adjustment in the following step S203 are compared with an unified error rate without parameter deviation and MCS level without parameter deviation based on the same standard.

In step S202, the UE returns correct or incorrect receiving judgment information to the base station.

Wherein, after receiving the above service data, the UE demodulates and decodes the service data, if decoding is correct, it indicates correct receiving, and phases of the service data are aligned; and if decoding is incorrect, it indicates incorrect receiving, and phases of the received service data are not aligned.

In step S203, according to the correct or incorrect receiving judgment information returned by the UE, the base station performs statistics of an error rate, such as a Block Error Ratio (BLER) or a Bit Error Rate (BER), or performs open loop link adaption to adjust an MCS level, and estimates the phase difference value closest to the true phase difference in the phase differences of the traversed values in accordance with a preset estimation policy according to the error rate or the MCS level.

Wherein, the preset estimation policy includes:

after the base station uses a certain phase difference in the value interval to calibrate the service data, if a difference between the error rate obtained from the statistics according to feedback of the UE and an error rate without parameter deviation is less than a preset threshold, judging the phase difference as a phase difference value closest to a true phase difference; or, after the base station uses a certain phase difference in the value interval to calibrate the service data, if a difference between the MCS level obtained by performing open loop link adaption adjustment according to feedback of the UE and an MCS level without parameter deviation is less than a preset threshold, judging the phase difference as a phase difference value closest to a true phase difference;

wherein, the MCS level without parameter deviation is acquired by the base station from the UE, the base station requests the UE for acquiring the MCS level without parameter deviation, and the UE feeds an MCS level without parameter deviation estimated by the UE back to the base station. Wherein, the error rate without parameter deviation is an error rate assumed when the UE measures the MCS level without parameter deviation and previously appointed by the base station and the UE.

Wherein, the MCS level without parameter deviation is an MCS level estimated by the UE based on an AP joint coherent transmission hypothesis and the measured downlink channel and interference condition, it is equivalent to an MCS level when there is no parameter deviation between the APs; the UE will assume an error rate when estimating the MCS, and the error rate is an error rate without parameter deviation.

Or, after the base station uses the phase differences of the traversed values to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference closest to a true phase difference;

or, after the base station uses the phase differences of the traversed values to calibrate the service data, comparing the error rate obtained from the statistics according to feedback of the UE or the MCS level obtained by performing the open loop link adaption adjustment, and taking a phase difference with a highest error rate or a lowest MCS level correspondingly obtained in the phase differences of the traversed values plus or minus pi as a phase difference closest to a true phase difference.

Figure 4:
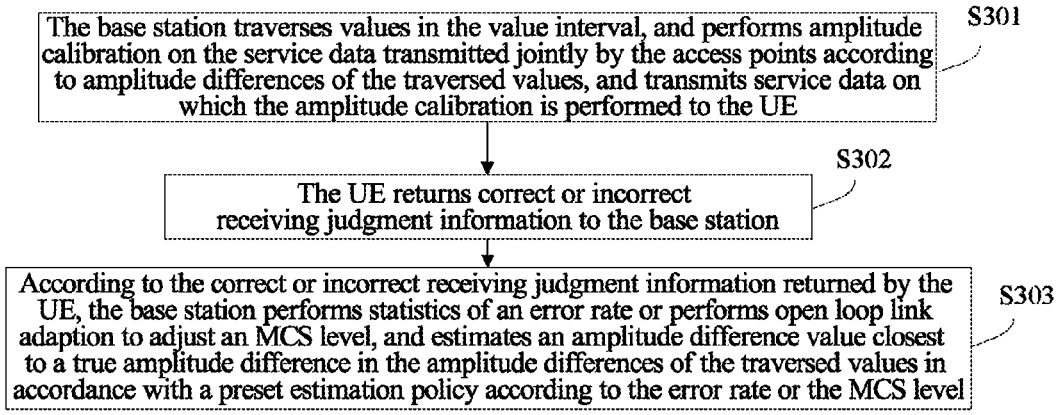
FIG. 4 is a flow diagram of estimating an amplitude difference value in the example.

Wherein, as shown in FIG. 4, the step of the base station estimating an amplitude difference value closest to a true amplitude difference in a value interval of an uplink and downlink channel amplitude difference between the APs includes the following steps.

In step S301, the base station traverses values in the value interval, and performs amplitude calibration on the service data transmitted jointly by the access points according to amplitude differences of the traversed values, and transmits service data on which the amplitude calibration is performed to the UE.

Wherein, similar to the step S201, before performing amplitude calibration on the service data transmitted jointly by the APs according to the amplitude differences of the traversed values, the base station also performs code modulation of the MCS level without parameter deviation on the service data, so as to guarantee that an error rate obtained from the statistics or an MCS level obtained from the open loop link adaption adjustment in the following step S303 are based on the same standard to be compared.

In step S302, the UE returns correct or incorrect receiving judgment information to the base station.

In step S303, according to the correct or incorrect receiving judgment information returned by the user equipment UE, the base station performs statistics of an error rate or performs open loop link adaption to adjust a modulation and coding scheme MCS level, and estimates the amplitude difference value closest to the true amplitude difference in the amplitude differences of the traversed values in accordance with a preset policy according to the error rate or the MCS level.

Wherein, the preset estimation policy includes:

after the base station uses a certain amplitude difference in the value interval to calibrate the service data, if a difference between the error rate obtained from the statistics according to feedback of the UE and an error rate without parameter deviation is less than a preset threshold, judging the amplitude difference as an amplitude difference value closest to a true amplitude difference; or, after the amplitude difference estimation module uses a certain amplitude difference in the value interval to calibrate the service data, if a difference between the MCS level obtained by performing open loop link adaption adjustment according to feedback of the UE and an MCS level without parameter deviation is less than a preset threshold, judging the amplitude difference as an amplitude difference value closest to a true amplitude difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;

Wherein, the MCS level without parameter deviation is an MCS level estimated by the UE based on an AP joint coherent transmission hypothesis and the measured downlink channel and interference condition, it is equivalent to an MCS level when there is no parameter deviation between the APs; the UE will assume an error rate when estimating the MCS, and the error rate is an error rate without parameter deviation.

Or, after the base station uses the amplitude differences of the traversed values to calibrate the service data, comparing the error rate obtained from the statistics according to feedback of the UE or the MCS level obtained by performing the open loop link adaption adjustment, and taking an amplitude difference with a lowest error rate or a highest MCS level correspondingly obtained in the amplitude differences of the traversed values as an amplitude difference value closest to a true amplitude difference.

Figure 5:
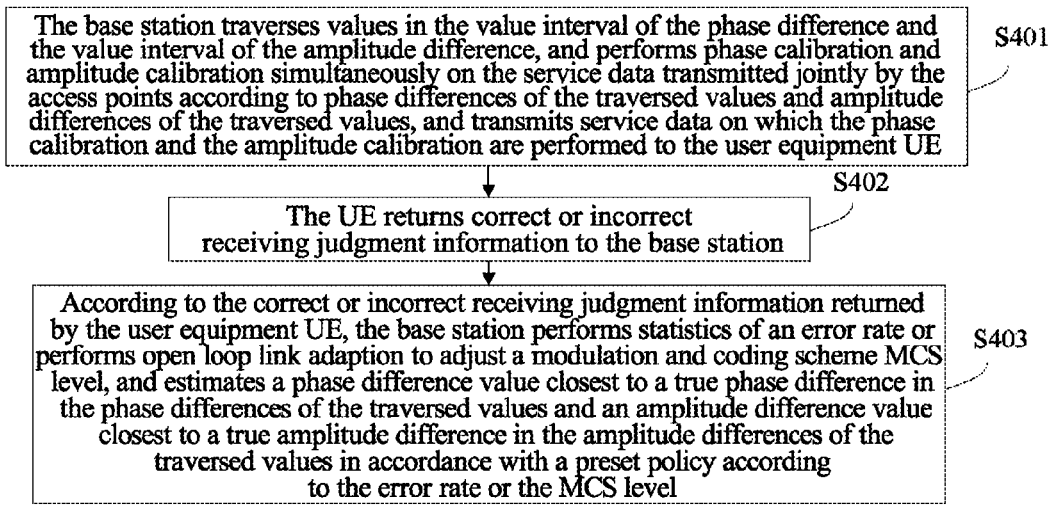
FIG. 5 is a flow diagram of simultaneously estimating a phase difference value and an amplitude difference value in the example.

Wherein, as shown in FIG. 5, the step of the base station estimating a phase difference value closest to a true phase difference in a value interval of an uplink and downlink channel phase difference between the APs, and meanwhile estimating an amplitude difference value closest to a true amplitude difference in a value interval of an uplink and downlink channel amplitude difference between the APs includes the following steps.

In step S401, the base station traverses values in the value interval of the phase difference and the value interval of the amplitude difference, and performs phase calibration and amplitude calibration simultaneously on the service data transmitted jointly by the access points according to phase differences of the traversed values and amplitude differences of the traversed values, and transmits service data on which the phase calibration and the amplitude calibration are performed to the user equipment UE.

Wherein, similar to the step S201, before performing phase calibration and amplitude calibration on the service data transmitted jointly by the APs according to the phase differences of the traversed values and the amplitude differences of the traversed values, the base station also performs code modulation of the MCS level without parameter deviation on the service data, so as to guarantee that an error rate obtained from the statistics or an MCS level obtained from the open loop link adaption adjustment in the following step S403 are based on the same standard to be compared.

In step S402, the UE returns correct or incorrect receiving judgment information to the base station.

In step S403, according to the correct or incorrect receiving judgment information returned by the user equipment UE, the base station performs statistics of an error rate or performs open loop link adaption to adjust a modulation and coding scheme MCS level, and estimates the phase difference value closest to the true phase difference in the phase differences of the traversed values and the amplitude difference value closest to the true amplitude difference in the amplitude differences of the traversed values in accordance with a preset policy according to the error rate or the MCS level.

Wherein, the preset estimation policy includes:

after the base station uses a certain phase difference in the value interval of the phase difference and a certain amplitude difference in the value interval of the amplitude difference to calibrate the service data, if a difference between the error rate obtained from the statistics according to feedback of the UE and an error rate without parameter deviation is less than a preset threshold, judging the phase difference as a phase difference value closest to a true phase difference and the amplitude difference as an amplitude difference value closest to a true amplitude difference; or, after the base station uses a certain phase difference in the value interval of the phase difference and a certain amplitude difference in the value interval of the amplitude difference to calibrate the service data, if a difference between the MCS level obtained by performing open loop link adaption adjustment according to feedback of the UE and an MCS level without parameter deviation is less than a preset threshold, judging the phase difference as a phase difference value closest to a true phase difference and the amplitude difference as an amplitude difference value closest to a true amplitude difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;

Wherein, the MCS level without parameter deviation is an MCS level estimated by the UE based on an AP joint coherent transmission hypothesis and the measured downlink channel and interference condition, it is equivalent to an MCS level when there is no parameter deviation between the APs; the UE will assume an error rate when estimating the MCS, and the error rate is an error rate without parameter deviation.

or, after the base station uses a certain phase difference in the value interval of the phase difference and a certain amplitude difference in the value interval of the amplitude difference to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference value closest to a true phase difference and an amplitude difference with a lowest error rate or a highest MCS level correspondingly obtained in the amplitude differences of the traversed values as an amplitude difference value closest to the true amplitude difference.

Figure 6:
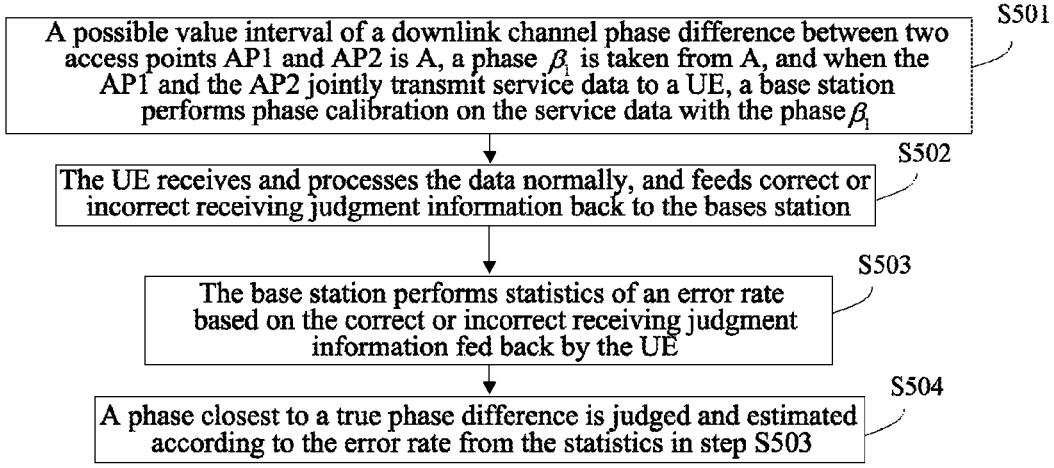
FIG. 6 is a flow diagram of a method for uplink and downlink channel phase calibration between an AP1 and an AP2 in an application example.

In one application example, a situation that phase calibration is performed on each RRU/access point is described, statistics of a BLER is performed based on the feedback of the UE, a phase difference is estimated through the BLER, two access points (APs) are taken as an example, and they are assumed as an AP1 and an AP2, each AP has a group of antennas. In the example, the two nouns RRU and access point AP are the same concept, which is also applicable to a scenario of more than two APs. As shown in FIG. 6, a method for uplink and downlink channel phase calibration between the AP1 and the AP2 includes the following steps.

In step S501, a possible value interval of an uplink and downlink channel phase difference between the two access points AP1 and AP2 is A, a phase $\beta_1$ is taken from A, and when the AP1 and the AP2 jointly transmit service data to a UE, a base station performs phase calibration on the service data with the phase $\beta_1$.

In step S502, the UE receives and processes the data normally, and feeds correct or incorrect receiving judgment information back to the bases station.

In step S503, the base station performs statistics of an error rate, such as a BLER or a BER, etc. based on the correct or incorrect receiving judgment information fed back by the UE.

In step S504, a phase β closest to a true phase difference Δθ is judged and estimated according to the error rate from the statistics in step S503. A phase estimation judgment is implemented in one of the following ways or a combination of multiple of the following ways.

(1) If an error rate obtained from statistics based on data on which phase $\beta_1$ calibration is performed is approximate to a preset error rate without parameter deviation, that is, a difference between the error rate and the error rate without parameter deviation is less than a preset threshold (an error tolerance range), the phase $\beta_1$ is judged as a phase difference between the two APs; and if a difference between the error rate and the error rate without parameter deviation is not less than a preset threshold, it continues to take another phase $\beta_2$ from the interval A, the above steps S501~S504 are repeated, and phase difference values in the interval A are traversed, until the phase difference β between the two APs satisfying the preset estimation policy (that is, a difference between the error rate and the error rate without parameter deviation is less than a preset threshold) is found.

(2) Or, it is assumed that, an error rate obtained from statistics based on data on which phase $\beta_1$ calibration is performed is a, and an error rate obtained from statistics based on data on which phase $\beta_2$ calibration is performed is b, if a>b, it is judged that the phase $\beta_2$ is more approximate to the true phase difference Δθ between the two APs; and it keeps traversing values in the interval A in this way, until an optimal estimation value namely a phase with a lowest error rate is found, and the phase with the lowest error rate is taken as the value β closest to the true phase difference.

(3) Or, it is assumed that, an error rate obtained from statistics based on data on which phase $\beta_1$ calibration is performed is a, and an error rate obtained from statistics based on data on which phase $\beta_2$ calibration is performed is b, if a>b, it is judged that the phase $\beta_1$ is more deviating from the true phase difference Δθ between the two APs, and it keeps traversing values in the interval A in this way, until a worst estimation value namely a phase β with a highest error rate is found. Since the deviation is reversed, when the worst estimation value is found, an optimally estimated phase difference value can be obtained by ±π.

Preferably, in order to reduce the times of traversing phases, the following method can be adopted to traverse values.

(a) It is assumed that the AP1 is not calibrated and the AP2 is calibrated, the values are traversed in this way: taking a center of the value range as a criterion, and taking a half of scope from center to edge as a right and left step length to traverse the values. For example, a value range of the value interval A is [−π,+π], a center of the value range namely a 0 degree is taken as a criterion, a phase $$\beta_{1,2} = \pm \frac{pi}{2}$$

is taken from A, statistics of BLERs of the AP2 when the phase difference is $$\beta_{1,2} = \pm \frac{pi}{2}$$

are respectively performed, and a phase difference with smaller BLERs is taken as a criterion for the next adjustment.

(b) It is assumed that the BLER obtained from the statistics when $$\beta_1 = \frac{pi}{2}$$

is smaller, and the phase $\beta_1$ may be more approximate to the true phase difference between the two APs, then $$\beta_1 = \frac{pi}{2}$$

is taken as a criterion, a half of $$\frac{pi}{2}$$

is taken as a right and left step length to traverse the values, statistics of BLERs of the AP2 when the phase difference is $$\beta_{3,4} = \frac{pi}{2} \pm \frac{pi}{4}$$

are respectively performed, and a phase difference with smaller BLERs is taken as a criterion for the next adjustment.

(c) It is assumed that the BLER obtained from the statistics when $$\beta_3 = \frac{pi}{4}$$

is smaller, thus $$\beta_3 = \frac{pi}{4}$$

is taken as a criterion, a half of $$\frac{pi}{4}$$

is taken as a right and left step length to traverse the values, statistics of BLERs of the AP2 when the phase difference is $$\beta_{5,6} = \frac{pi}{4} \pm \frac{pi}{8}$$

are respectively performed, and a smaller phase difference of the BLERs is taken as a criterion for the next adjustment.

(d) According to the above steps, until a BLER obtained from the statistics is approximate to the preset error rate without parameter deviation, a phase difference corresponding to the BLER can be obtained.

Moreover, in order to make the above scheme more effective, an Open Loop Link Adaption (OLLA) function can be preferably closed.

Figure 7:
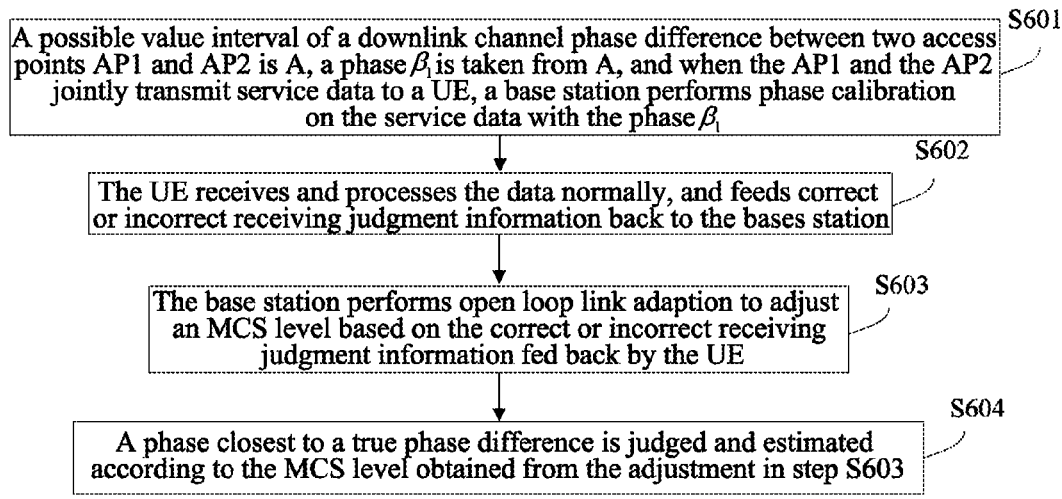
FIG. 7 is a flow diagram of a method for uplink and downlink channel phase calibration between an AP1 and an AP2 in an application example.

In another application example, a situation that phase calibration is performed on each RRU/access point is described, open loop link adaption is performed to adjust an MCS level based on the feedback of the UE, a phase difference value β is estimated through the MCS level, two access points (APs) are taken as an example, and they are assumed as an AP1 and an AP2, each AP has a group of antennas. In the example, the two nouns RRU and access point AP are the same concept, which is also applicable to a scenario of more than two APs. As shown in FIG. 7, a method for uplink and downlink channel phase calibration between the AP1 and the AP2 includes the following steps.

In step S601, a possible value interval of an uplink and downlink channel phase difference between the two access points AP1 and AP2 is A, a phase $\beta_1$ is taken from A, and when the AP1 and the AP2 jointly transmit service data to a UE, a base station performs phase calibration on the service data with the phase $\beta_1$.

In step S602, the UE receives and processes the data normally, and feeds correct or incorrect receiving judgment information back to the bases station.

In step S603, the base station performs open loop link adaption to adjust an MCS level based on the correct or incorrect receiving judgment information fed back by the UE.

In step S604, a phase β closest to a true phase difference Δθ is judged and estimated according to the MCS level obtained from the adjustment in step S603. A phase difference estimation judgment is implemented in one of the following ways or a combination of the following multiple ways.

(1) If an MCS level obtained from adjustment based on data on which phase $\beta_1$ calibration is performed is approximate to a preset MCS level without parameter deviation, that is, a difference between the MCS level and the MCS level without parameter deviation is less than a preset threshold, the phase $\beta_1$ is judged as a phase difference between the two APs; and if a difference between the MCS level and the MCS level without parameter deviation is not less than a preset threshold, it continues to take another phase $\beta_2$ from the interval A, the above steps S601~S604 are repeated, and phase difference values in the interval A are traversed, until the phase difference β between the two APs satisfying a preset judgment criterion (that is, a difference between the MCS level and the MCS level without parameter deviation is less than a preset threshold) is found.

(2) Or, it is assumed that, an MCS level obtained from adjustment based on data on which phase $\beta_1$ calibration is performed is c, and an MCS level obtained from adjustment based on data on which phase $\beta_2$ calibration is performed is d, if c>d, it is judged that the phase $\beta_1$ is more approximate to the true phase difference between the two APs; and it keeps traversing values in the interval A in this way, until an optimal estimation value namely a phase with a highest MCS level is found, and the phase with the highest MCS level is taken as the value β closest to the true phase difference Δθ.

(3) Or, it is assumed that, an MCS level obtained from adjustment based on data on which phase $\beta_1$ calibration is performed is c, and an MCS level obtained from adjustment based on data on which phase $\beta_2$ calibration is performed is d, if c>d, it is judged that the phase $\beta_2$ is more deviating from the true phase difference Δθ between the two APs, and it keeps traversing values in the interval A in this way, until a worst estimation value namely a phase β with a lowest MCS level is found. Since the deviation is reversed, when the worst estimation value is found, an optimally estimated phase difference value can be obtained by ±π.

In the example, it can estimate a phase difference individually to perform phase calibration: the base station estimates a phase estimation value β closest to the true phase difference, and calibrates the phase individually; it can also estimate an amplitude difference individually to perform amplitude calibration: an amplitude estimation value α closest to the true amplitude difference is estimated, and the amplitude is calibrated individually; and, the phase difference and the amplitude difference are estimated simultaneously: the base station estimates a phase estimation value β and an amplitude estimation value α, and calibrates the phase and the amplitude simultaneously.

In another application example, a situation that a phase difference Δθ and an amplitude difference ΔA can be estimated simultaneously is described below, wherein, the logical steps of estimating the phase difference and estimating the amplitude difference are basically identical, that is, it traverses to take the phase difference and the amplitude difference simultaneously, and then a judgment is made based on BLER/MCS, that is, statistics of a BLER is performed based on the feedback of the UE, and the phase difference Δθ and amplitude difference ΔA are estimated through the BLER, or open loop link adaption is performed to adjust an MCS level based on the feedback of the UE, and the phase difference Δθ and amplitude difference ΔA are estimated through the MCS level;

β and α are estimated, which makes β approximately equal to Δθ within the error tolerance range, and makes α approximately equal to ΔA within the error tolerance range in the meantime. The base station estimates the phase estimation value β closest to the true phase difference and the amplitude estimation value α closest to the true amplitude difference, and performs phase calibration and amplitude calibration simultaneously.

Figure 8:
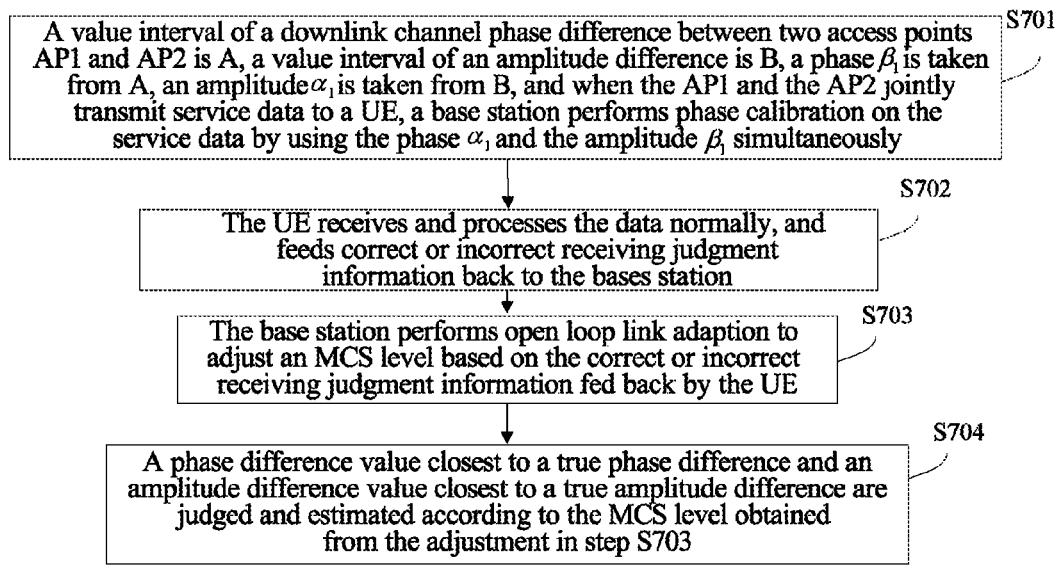
FIG. 8 is a flow diagram of a method for simultaneously performing uplink and downlink channel phase calibration and amplitude calibration between an AP1 and an AP2 in an application example.

Wherein, a method for estimating the phase difference may refer to the method mentioned in the application examples shown in FIG. 5 and FIG. 6; and a logical idea of estimating the amplitude difference is roughly similar to that of estimating the phase difference, for example, by taking the estimation of the phase difference Δθ and amplitude difference ΔA through the MCS level as an example, as shown in FIG. 8, performing the uplink and downlink channel phase calibration and amplitude calibration between the AP1 and the AP2 includes the following steps.

In step S701, a possible value interval of an uplink and downlink channel phase difference between the two access points AP1 and AP2 is A, a possible value interval of an amplitude difference is B, a phase $\beta_1$ is taken from A, an amplitude $\alpha_1$ is taken from B, and when the AP1 and the AP2 jointly transmit service data to a UE, a base station performs amplitude calibration on the service data by using the phase $\beta_1$ and the amplitude $\alpha_1$ simultaneously.

In step S702, the UE receives and processes the data normally, and performs feedback of correct or incorrect receiving judgment information to the bases station.

In step S703, the base station performs open loop link adaption to adjust an MCS level based on the correct or incorrect receiving judgment information fed back by the UE.

In step S704, a phase β closest to a true phase difference Δθ and an amplitude difference value α closest to a true amplitude difference ΔA are judged and estimated according to the MCS level adjusted in step S703.

A phase difference and amplitude difference estimation judgment is implemented in one of the following ways or a combination of multiple of the following multiple ways.

(1) If an MCS level obtained from adjustment based on data on which phase $\beta_1$ calibration and amplitude $\alpha_1$ calibration are performed is approximate to a preset MCS level without parameter deviation, that is, a difference between the MCS level and the MCS level without parameter deviation is less than a preset threshold, the phase $\beta_1$ and the amplitude $\alpha_1$ are judged as a phase difference and an amplitude difference between the two APs; and if a difference between the MCS level and the MCS level without parameter deviation is not less than a preset threshold, it continues to take another phase $\beta_2$ from the interval A and to take another amplitude value $\alpha_2$ from the interval B, the above steps S701~S704 are repeated, phase difference values in the interval A are traversed, and amplitude values in the interval B are traversed, until the phase difference β and the amplitude difference α between the two APs satisfying a preset judgment criterion (that is, a difference between the MCS level and the MCS level without parameter deviation is less than a preset threshold) are found.

(2) Or, it is assumed that, an MCS level obtained from adjustment based on data on which phase $\beta_1$ calibration and amplitude $\alpha_1$ calibration are performed is e, and an MCS level obtained from adjustment based on data on which phase $\beta_2$ calibration and amplitude $\alpha_2$ calibration are performed is f, if e>f, it is judged that the phase $\beta_1$ and amplitude $\alpha_1$ are more approximate to the true phase difference and true amplitude difference between the two APs.

And it keeps traversing values in the interval A and the interval B in this way, until optimal estimation values namely a phase with a highest MCS level and an amplitude with a highest MCS level are found, and the phase with the highest MCS level is taken as the value β closest to the true phase difference Δθ and the amplitude with the highest MCS level is taken as the value α closest to the true amplitude difference ΔA.

As can be seen from the above examples, compared with the related art, with the method and device for multi-access point calibration provided in the above examples, a cell calculates a parameter difference between different access points, and then calibrates multiple access points according to the parameter difference, phase calibration and amplitude calibration can be performed individually, and phase calibration and amplitude calibration can also be performed simultaneously, so that a problem that the phase difference and amplitude difference exist between the data transmitted jointly between the multiple access points is solved, and thus it can be guaranteed that good coherent transmission is performed between the access points, thereby improving the system performance.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above description is only the preferred examples of the present document, which is not used to limit the protection scope of the present document. According to the summary of the document of the present document, it can still have other various examples, the skilled familiar to the art can make various corresponding changes and transformations according to the present document without departing from the spirit and essence of the present document. All the modifications, equivalent substitutions, and improvements, etc. made within the spirit and principle of the present document shall fall into the protection scope of the present document.

INDUSTRIAL APPLICABILITY

Compared with the related art, with the method and device for multi-access point calibration provided in the embodiment of the present document, a problem that the phase difference and amplitude difference exist between the data transmitted jointly between the multiple access points is solved, and thus it can be guaranteed that good coherent transmission is performed between the access points, thereby improving the system performance.

What is claimed is:

1. A method for multi-access point calibration, comprising:
   a base station estimating a value closest to a true parameter deviation in a value interval of an uplink and downlink channel parameter deviation between access points; and
   the base station performing parameter calibration on service data transmitted jointly by the access points according to the estimated value.

2. The method according to claim 1, wherein,
the parameter deviation comprises: a phase difference and an amplitude difference;
the step of the base station estimating a value closest to a true parameter deviation in a value interval of an uplink and downlink channel parameter deviation between access points comprises at least one of: the base station estimating a phase difference value closest to a true phase difference in a value interval of an uplink and downlink channel phase difference between the access points; and, the base station estimating an amplitude difference value closest to a true amplitude difference in a value interval of an uplink and downlink channel amplitude difference between the access points; and
the step of the base station performing parameter calibration on service data transmitted jointly by the access points according to the estimated value comprises at least one of: the base station performing phase calibration on the data transmitted jointly by the access points according to the estimated phase difference value; and, the base station performing amplitude calibration on the data transmitted jointly by the access points according to the estimated amplitude difference value.

3. The method according to claim 2, wherein,
the step of the base station estimating a phase difference value closest to a true phase difference in a value interval of an uplink and downlink channel phase difference between the access points comprises:
the base station traversing values in the value interval of the phase difference, and performing phase calibration on the service data transmitted jointly by the access points according to phase differences of traversed values, and transmitting service data on which the phase calibration is performed to a User Equipment (UE); and
according to correct or incorrect receiving judgment information returned by the UE, the base station performing statistics of an error rate or performing open loop link adaption to adjust a Modulation and Coding Scheme (MCS) level, and estimating the phase difference value closest to the true phase difference in the phase differences of the traversed values in accordance with a preset estimation policy according to the error rate or the MCS level.

4. The method according to claim 3, wherein,
the preset estimation policy comprises:
after the base station uses a phase difference in the value interval of the phase difference to calibrate the service data, if a difference between the error rate obtained from the statistics fed back by the UE and an error rate without parameter deviation is less than a preset threshold, judging the phase difference as a phase difference closest to a true phase difference; or, after the base station uses a phase difference in the value interval of the phase difference to calibrate the service data, if a difference between the MCS level obtained by performing open loop link adaption adjustment according to feedback of the UE and an MCS level without parameter deviation is less than a preset threshold, judging the phase difference as a phase difference closest to a true phase difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;
or, after the base station uses the phase differences of the traversed values to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference closest to a true phase difference;
or, after the base station uses the phase differences of the traversed values to calibrate the service data, comparing the error rate obtained from the statistics according to feedback of the UE or the MCS level obtained by performing the open loop link adaption adjustment, and taking a phase difference with a highest error rate or a lowest MCS level correspondingly obtained in the phase differences of the traversed values plus or minus pi as a phase difference closest to a true phase difference.

5. The method according to claim 2, wherein,
the step of the base station estimating an amplitude difference value closest to a true amplitude difference in a value interval of an uplink and downlink channel amplitude difference between the access points comprises:
the base station traversing values in the value interval of the amplitude difference, performing amplitude calibration on the service data transmitted jointly by the access points according to amplitude differences of traversed values, and transmitting service data on which the amplitude calibration is performed to the UE; and
according to correct or incorrect receiving judgment information returned by the UE, the base station performing statistics of an error rate or performing open loop link adaption to adjust an MCS level, and estimating the amplitude difference value closest to the true amplitude difference in the amplitude differences of the traversed values in accordance with a preset policy according to the error rate or the MCS level.

6. The method according to claim 5, wherein,
the preset policy comprises:
after the base station uses an amplitude difference in the value interval of the amplitude difference to calibrate the service data, if a difference between the error rate obtained from the statistics according to feedback of the UE and an error rate without parameter deviation is less than a preset threshold, judging the amplitude difference as an amplitude difference closest to a true amplitude difference; or, after the base station uses an amplitude difference in the value interval of the amplitude difference to calibrate the service data, if a difference between the MCS level obtained by performing open loop link adaption adjustment according to feedback of the UE and an MCS level without parameter deviation is less than a preset threshold, judging the amplitude difference as an amplitude difference closest to a true amplitude difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;
or, after the base station uses the amplitude differences of the traversed values to calibrate the service data, comparing the error rate obtained from the statistics according to feedback of the UE or the MCS level obtained by performing the open loop link adaption adjustment, and taking an amplitude difference with a lowest error rate or a highest MCS level correspondingly obtained in the amplitude differences of the traversed values as an amplitude difference closest to a true amplitude difference.

7. The method according to claim 2, wherein,
the step of the base station estimating a phase difference value closest to a true phase difference in a value interval of an uplink and downlink channel phase difference between the access points, and meanwhile estimating an amplitude difference value closest to a true amplitude difference in a value interval of an uplink and downlink channel amplitude difference between the access points comprises:
the base station traversing values in the value interval of the phase difference and the value interval of the amplitude difference, and performing phase calibration and amplitude calibration simultaneously on the service data transmitted jointly by the access points according to phase differences of traversed values and amplitude differences of traversed values, and transmitting service data on which the phase calibration and the amplitude calibration are performed to the UE; and
according to correct or incorrect receiving judgment information returned by the UE, the base station performing statistics of an error rate or performing open loop link adaption to adjust an MCS level, and estimating the phase difference value closest to the true phase difference in the phase differences of the traversed values and the amplitude difference value closest to the true amplitude difference in the amplitude differences of the traversed values in accordance with a preset policy according to the error rate or the MCS level.

8. The method according to claim 7, wherein,
the preset policy comprises:
after the base station uses a phase difference in the value interval of the phase difference and an amplitude difference in the value interval of the amplitude difference to calibrate the service data, if a difference between the error rate obtained from the statistics according to feedback of the UE and an error rate without parameter deviation is less than a preset threshold, judging the phase difference as a phase difference value closest to a true phase difference and the amplitude difference as an amplitude difference closest to a true amplitude difference; or, after the base station uses a phase difference in the value interval of the phase difference and an amplitude difference in the value interval of the amplitude difference to calibrate the service data, if a difference between the MCS level obtained by performing open loop link adaption adjustment according to feedback of the UE and an MCS level without parameter deviation is less than a preset threshold, judging the phase difference as a phase difference value closest to a true phase difference and the amplitude difference as an amplitude difference closest to a true amplitude difference; wherein, the MCS level without parameter deviation is obtained by the base station requesting the UE for acquisition, and the error rate without parameter deviation is an error rate assumed when the UE measures the MCS level without parameter deviation and previously appointed by the base station and the UE;
or, after the base station uses a phase difference in the value interval of the phase difference and an amplitude difference in the value interval of the amplitude difference to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference value closest to a true phase difference and an amplitude difference with a lowest error rate or a highest MCS level correspondingly obtained in the amplitude differences of the traversed values as an amplitude difference value closest to the true amplitude difference.

9. The method according to claim 3, further comprising:
before performing at least one of phase calibration on the service data transmitted jointly by the access points according to the phase differences of the traversed values and amplitude calibration on the service data transmitted jointly by the access points according to the amplitude differences of the traversed values, the base station firstly performing code modulation of the MCS level without parameter deviation on the service data.

10. A device for multi-access point calibration, comprising a processor for performing steps in a parameter deviation estimation module and a parameter calibration module, wherein:
the parameter deviation estimation module is configured to estimate a value closest to a true parameter deviation in a value interval of an uplink and downlink channel parameter deviation between access points; and
the parameter calibration module is configured to perform parameter calibration on service data transmitted jointly by the access points according to the estimated value estimated by the parameter deviation estimation module.

11. The device according to claim 10, wherein,
the parameter deviation comprises: a phase difference and an amplitude difference;
the parameter deviation estimation module comprises:
a phase difference estimation module, configured to: estimate a phase difference value closest to a true phase difference in a value interval of an uplink and downlink channel phase difference between the access points;
an amplitude difference estimation module, configured to: estimate an amplitude difference value closest to a true amplitude difference in a value interval of an uplink and downlink channel amplitude difference between the access points; and
a phase difference and amplitude difference estimation module, configured to: estimate a phase difference value closest to a true phase difference in a value interval of an uplink and downlink channel phase difference between the access points, and meanwhile estimate an amplitude difference value closest to a true amplitude difference in a value interval of an uplink and downlink channel amplitude difference between the access points;
wherein, the parameter calibration module is configured to perform parameter calibration on service data transmitted jointly by the access points in the following way:
performing at least one of phase calibration on the data transmitted jointly by the access points according to the estimated phase difference value and amplitude calibration on the data transmitted jointly by the access points according to the estimated amplitude difference value.

12. The device according to claim 11, wherein,
the phase difference estimation module is configured to estimate a phase difference value closest to a true phase difference in the following way:
traversing values in the value interval of the phase difference, and performing phase calibration on the service data transmitted jointly by the access points according to phase differences of traversed values, and transmitting service data on which the phase calibration is performed to a User Equipment (UE); and
according to correct or incorrect receiving judgment information returned by the UE, performing statistics of an error rate or performing open loop link adaption to adjust a Modulation and Coding Scheme (MCS) level, and estimating a phase difference closest to the true phase difference in the phase differences of the traversed values in accordance with a preset estimation policy according to the error rate or the MCS level.

13. The device according to claim 12, wherein,
the phase difference estimation module is further configured to: before performing phase calibration on the service data transmitted jointly by the access points according to the phase differences of the traversed values, firstly perform code modulation of the MCS level without parameter deviation on the service data.

14. The device according to claim 12, wherein,
the preset estimation policy comprises:
after the phase difference estimation module uses a phase difference in the value interval of the phase difference to calibrate the service data, if a difference between the error rate obtained from the statistics according to feedback of the UE and an error rate without parameter deviation is less than a preset threshold, judging the phase difference as a phase difference closest to a true phase difference; or, after the phase difference estimation module uses a phase difference in the value interval of the phase difference to calibrate the service data, if a difference between the MCS level obtained by performing open loop link adaption adjustment according to feedback of the UE and an MCS level without parameter deviation is less than a preset threshold, judging the phase difference as a phase difference closest to a true phase difference; wherein, the MCS level without parameter deviation is obtained by a base station in which the device is located requesting the UE for acquisition, and the error rate without parameter deviation is an error rate assumed when the UE measures the MCS level without parameter deviation and previously appointed by the base station and the UE;
or, after the phase difference estimation module uses the phase differences of the traversed values to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference closest to a true phase difference;
or, after the phase difference estimation module uses the phase differences of the traversed values to calibrate the service data, comparing the error rate obtained from the statistics according to feedback of the UE or the MCS level obtained by performing the open loop link adaption adjustment, and taking a phase difference with a highest error rate or a lowest MCS level correspondingly obtained in the phase differences of the traversed values plus or minus pi as a phase difference closest to a true phase difference.

15. The device according to claim 11, wherein,
the amplitude difference estimation module is configured to estimate an amplitude difference value closest to a true amplitude difference in the following way:
traversing values in the value interval of the amplitude difference, and performing amplitude calibration on the service data transmitted jointly by the access points according to amplitude differences of traversed values, and transmitting service data on which the amplitude calibration is performed to the UE; and
according to correct or incorrect receiving judgment information returned by the UE, performing statistics of an error rate or performing open loop link adaption to adjust an MCS level, and estimating the amplitude difference value closest to the true amplitude difference in the amplitude differences of the traversed values in accordance with a preset policy according to the error rate or the MCS level.

16. The device according to claim 15, wherein,
the amplitude difference estimation module is further configured to: before performing amplitude calibration on the service data transmitted jointly by the access points according to the amplitude differences of the traversed values, firstly perform code modulation of the MCS level without parameter deviation on the service data.

17. The device according to claim 15, wherein,
the preset policy comprises:
after the amplitude difference estimation module uses an amplitude difference in the value interval of the amplitude difference to calibrate the service data, if a difference between the error rate obtained from the statistics according to feedback of the UE and an error rate without parameter deviation is less than a preset threshold, judging the amplitude difference as an amplitude difference closest to a true amplitude difference; or, after the amplitude difference estimation module uses an amplitude difference in the value interval of the amplitude difference to calibrate the service data, if a difference between the MCS level obtained by performing open loop link adaption adjustment according to feedback of the UE and an MCS level without parameter deviation is less than a preset threshold, judging the amplitude difference as an amplitude difference closest to a true amplitude difference; wherein, the MCS level without parameter deviation is obtained by a base station in which the device is located requesting the UE for acquisition, and the error rate without parameter deviation is an error rate assumed when the UE measures the MCS level without parameter deviation and previously appointed by the base station and the UE;
or, after the amplitude difference estimation module uses the amplitude differences of the traversed values to calibrate the service data, comparing the error rate obtained from the statistics according to feedback of the UE or the MCS level obtained by performing the open loop link adaption adjustment, and taking an amplitude difference with a lowest error rate or a highest MCS level correspondingly obtained in the amplitude differences of the traversed values as an amplitude difference closest to a true amplitude difference.

18. The device according to claim 11, wherein,
the phase difference and amplitude difference estimation module is configured to estimate a phase difference value closest to a true phase difference, and meanwhile estimate an amplitude difference value closest to a true amplitude difference in the following way:
traversing values in the value interval of the phase difference and the value interval of the amplitude difference, and performing phase calibration and amplitude calibration simultaneously on the service data transmitted jointly by the access points according to phase differences of traversed values and amplitude differences of traversed values, and transmitting service data on which the phase calibration and the amplitude calibration are performed to the UE; and
according to correct or incorrect receiving judgment information returned by the UE, performing statistics of an error rate or performing open loop link adaption to adjust an MCS level, and estimating the phase difference value closest to the true phase difference in the phase differences of the traversed values and the amplitude difference value closest to the true amplitude difference in the amplitude differences of the traversed values in accordance with a preset policy according to the error rate or the MCS level.

19. The device according to claim 18, wherein,
the phase difference and amplitude difference estimation module is further configured to: before performing phase calibration and amplitude calibration on the service data transmitted jointly by the access points according to the phase differences of the traversed values and the amplitude differences of the traversed values, firstly perform code modulation of the MCS level without parameter deviation on the service data.

20. The device according to claim 18, wherein,
the preset policy comprises:
after the phase difference and amplitude difference estimation module uses a phase difference in the value interval of the phase difference and an amplitude difference in the value interval of the amplitude difference to calibrate the service data, if a difference between the error rate obtained from the statistics according to feedback of the UE and an error rate without parameter deviation is less than a preset threshold, judging the phase difference as a phase difference value closest to a true phase difference and the amplitude difference as an amplitude difference closest to a true amplitude difference; or, after the phase difference and amplitude difference estimation module uses a phase difference in the value interval of the phase difference and an amplitude difference in the value interval of the amplitude difference to calibrate the service data, if a difference between the MCS level obtained by performing open loop link adaption adjustment according to feedback of the UE and an MCS level without parameter deviation is less than a preset threshold, judging the phase difference as a phase difference value closest to a true phase difference and the amplitude difference as an amplitude difference closest to a true amplitude difference; wherein, the MCS level without parameter deviation is obtained by a base station in which the device is located requesting the UE for acquisition, and the error rate without parameter deviation is an error rate assumed when the UE measures the MCS level without parameter deviation and previously appointed by the base station and the UE;

or, after the phase difference and amplitude difference estimation module uses a phase difference in the value interval of the phase difference and an amplitude difference in the value interval of the amplitude difference to calibrate the service data, comparing the error rate obtained from the statistics according to feedback of the UE or the MCS level obtained by performing the open loop link adaption adjustment, and taking a phase difference with a lowest error rate or a highest MCS level correspondingly obtained in the phase differences of the traversed values as a phase difference value closest to a true phase difference and an amplitude difference with a lowest error rate or a highest MCS level correspondingly obtained in the amplitude differences of the traversed values as an amplitude difference value closest to a true amplitude difference.

* * * * *